June 4, 1940.  A. L. SLEE  2,203,239
HOLDER
Filed Jan. 22, 1940   2 Sheets-Sheet 1

INVENTOR.
Arthur L. Slee

June 4, 1940.　　A. L. SLEE　　2,203,239
HOLDER
Filed Jan. 22, 1940　　2 Sheets-Sheet 2
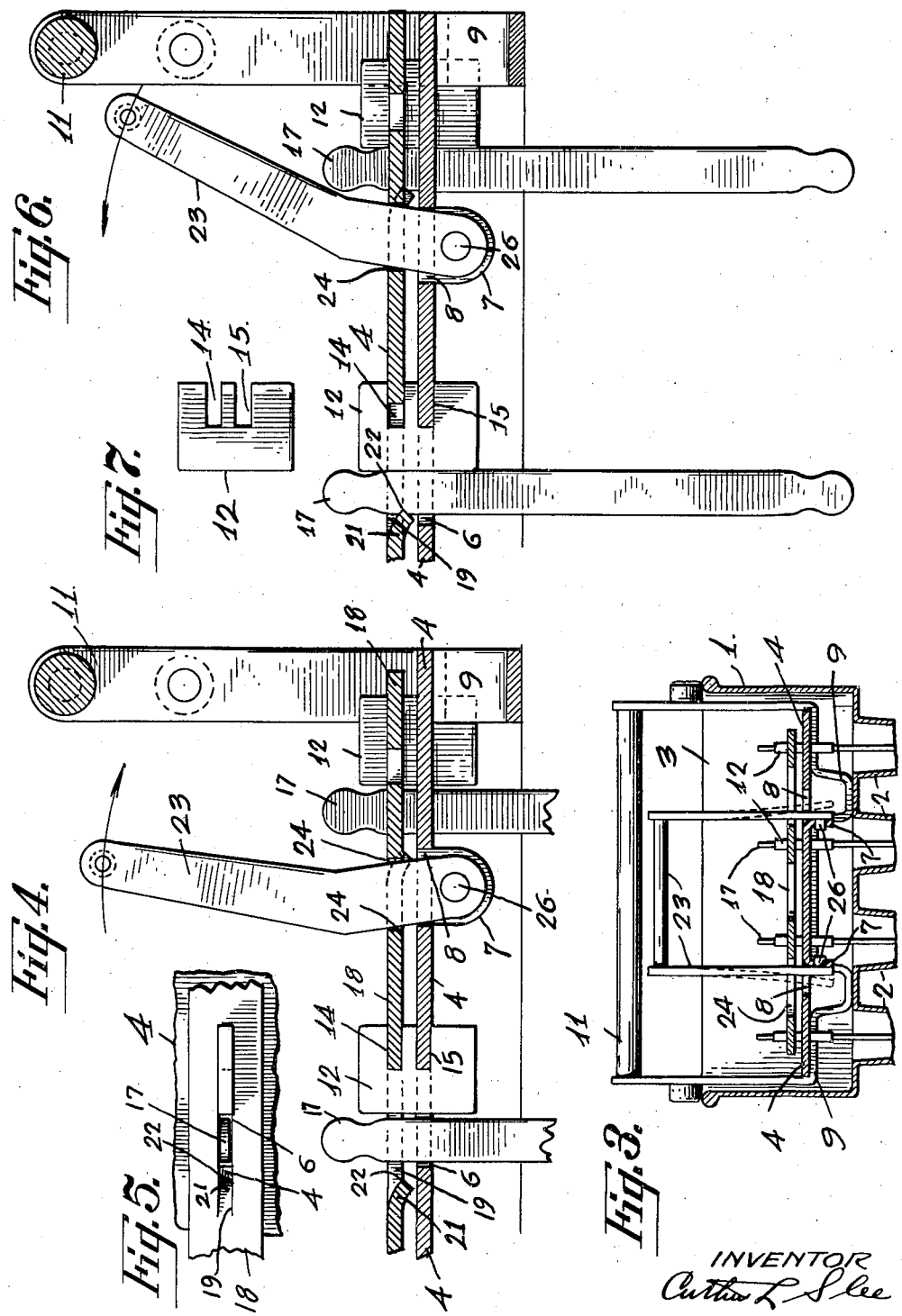
INVENTOR
Arthur L. Slee Patented June 4, 1940

2,203,239

UNITED STATES PATENT OFFICE 2,203,239

HOLDER

Arthur L. Slee, San Francisco, Calif., assignor of one-third to Eric C. Hughes, one-third to Jennie C. Hughes, and one-third to Maxwell B. Hughes, all of West Sacramento, Calif.

Application January 22, 1940, Serial No. 314,997

4 Claims. (Cl. 294—87)

My invention relates to a holder for holding the sticks or handles of a frozen confection during production of such confection and for withdrawing the same from a mold after production.

In the art of producing a frozen confection of the "Popsicle" or "Creamsicle" type, a handle or stick is held in the approximate center of a mold and in spaced relation to the inner walls thereof while liquid or plastic ingredients of the confection to be produced within the mold are congealed or otherwise secured to said stick or handle. After the confection is completed, the mold is defrosted to release the frozen confection therefrom and the same is then withdrawn from said mold by means of the stick or handle which later serves for the convenience of the consumer.

To facilitate mass production, the molds are arranged in groups and a mechanical holder is employed to hold a plurality of sticks in proper position relatively to the molds throughout the congealing process in order that the finished product may be properly positioned on said sticks. After the molds are defrosted, the holder, still gripping the sticks, is lifted from the molds thereby removing the frozen confections. The sticks are then released from the holder.

The primary object of the present invention is to provide a new and improved holder for holding one or more sticks or handles in fixed relation to a mold or molds.

Another object is to provide a new and improved device of the character described having greatly simplified and an open or spaced construction to facilitate separation and cleaning of the several parts.

A further object is to provide a new and improved holder of simple and economic construction having greatly simplified and improved means for operating and holding several separable parts operatively connected.

A still further object is to provide a new and improved device of the type set forth, having greatly simplified and easily produced and operated parts for gripping a plurality of sticks attached to frozen confections to facilitate their removal from molds.

The invention consists in the improved and simplified construction and arrangement of parts as disclosed in the drawings forming a part of the present application, and in which—

Fig. 3 is a transverse sectional view taken on line 3—3 of Fig. 2, in the direction indicated;

Fig. 4 is an enlarged, broken detailed view of a single mold and one stick gripped and held in a fixed position relatively to said mold;

Fig. 5 is a broken plan view of that portion of Fig. 4 directly below;

Fig. 6 is a view similar to Fig. 4 but with the stick engaged; and

Fig. 7 is a detailed view of a block detached from the main plate.

Figure 1:
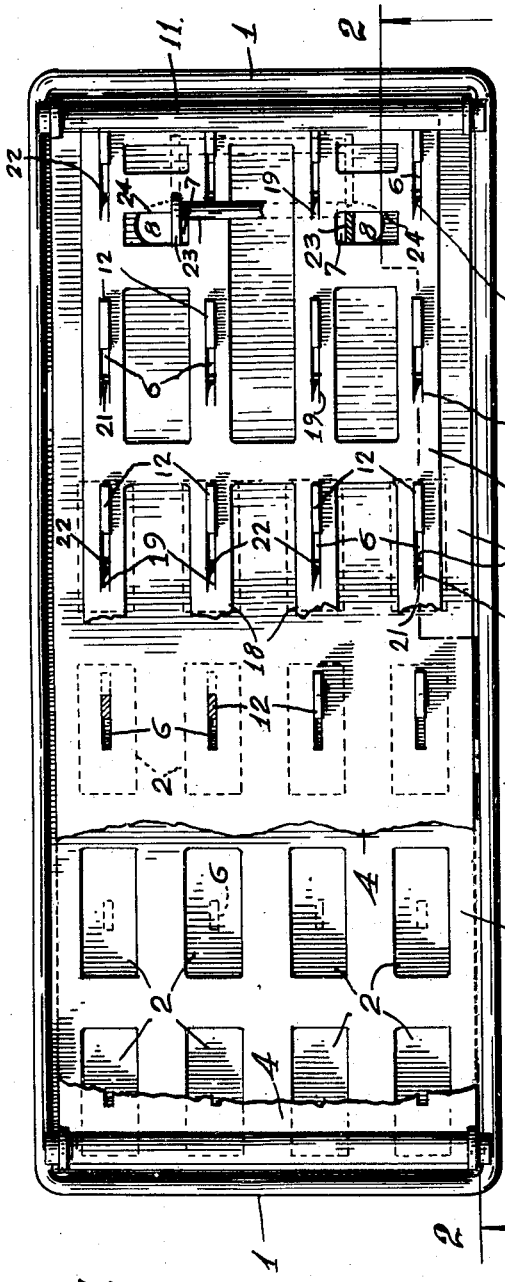
Fig. 1 is a plan view of a group-mold with my holder partly broken away.

Referring to the drawings:

The numeral 1 is used to designate a pan having a plurality of individual molds 2 depending from an upper basin 3 therein.

The invention comprises a preferably horizontal plate 4 having a plurality of longitudinally disposed slots 6, a pair of struck-up apertured lugs 7 and their vacated spaces 8, and supports 9 at each end of said plate 4. The supports 9 extend upwardly to form handles 11 for lifting and transporting the holder.

Within one end of each slot 6 is rigidly secured a laterally disposed or extended block 12, each block having upper and lower longitudinally disposed parallel slots 14 and 15, respectively in one lateral edge thereof, the lower slot 15 rigidly secured within one end of its respective slot 6 of the plate 4, with the opposite edge of said block 12 held in spaced relation to the other end of said slot 6 a distance slightly greater than the width of a handle or stick 17, inserted, in a manner and for a purpose hereinafter more fully set forth, through the slot 6.

A grid 18 is provided with a plurality of longitudinally disposed slots 19, each having a partially struck-up lug 21 to provide a sharp edge 22 at one end of each slot 19, the other end of said slot 19 slidably engaging the upper slot 14 of the block 12 so that the grid 18 is slidably held in spaced parallel relation above the plate 4 with the slots 19 and 6 substantially registering, as disclosed in Figs. 2, 3, 4 and 6 of the drawings.

A bifurcated lever 23, preferably of spring material, has the legs thereof extending through openings 24 in the grid 18, to operatively engage the same, through the vacated spaces 8 of the apertured lugs 7 of the plate 4, the ends of said legs being provided with pins 26 for pivotally and detachably engaging said apertured lugs 7.

The movement of the bifurcated operating lever 23 to shift the grid 18 upon the plate 4 a limited distance substantially equal to one-half the length of the upper slots 14 of the block 12, is limited in each direction by the width of the vacated spaces 8, as shown in opposite extreme positions in Figs. 4 and 6 of the drawings.

In operation:

The molds 2 contain a liquid or plastic ingredient 2' within which it is desired to centrally hold the sticks or handles 17 until said ingredient 2' is congealed or otherwise firmly secured upon said handle by passing the pan 1 and molds 2 through a freezing or congealing process.

The handles or sticks 17 are inserted, in conjunction with other limiting means, not shown, as they form no part of the present invention, through the substantially registering slots 19 of the grid 18 and slots 6 of the plate 4, while said grid is in releasing position, as indicated in Fig. 4 of the drawings. That is to say, the operating lever 23 will be in the extreme position that holds the sharp edges 22 of the lugs 21 on the grid 18 away from the sticks 17. By moving the lever 23 to its opposite extreme position, the sharp edges 22 on the slidably mounted grid 18 will be moved to engage the adjacent edges of the sticks 17 and said sticks are thereby not only held in rigid lateral alignment against the backs of the blocks 12, which form one end of the registered slots 6 and 19, and therefore in proper relation to the holder itself, molds 2 and ingredients 2' therein, but said sharp edges 22 also firmly engage said sticks 17 and hold them against longitudinal movement through the registered slots 6 and 19, as disclosed in Fig. 6 of the drawings.

Figure 2:
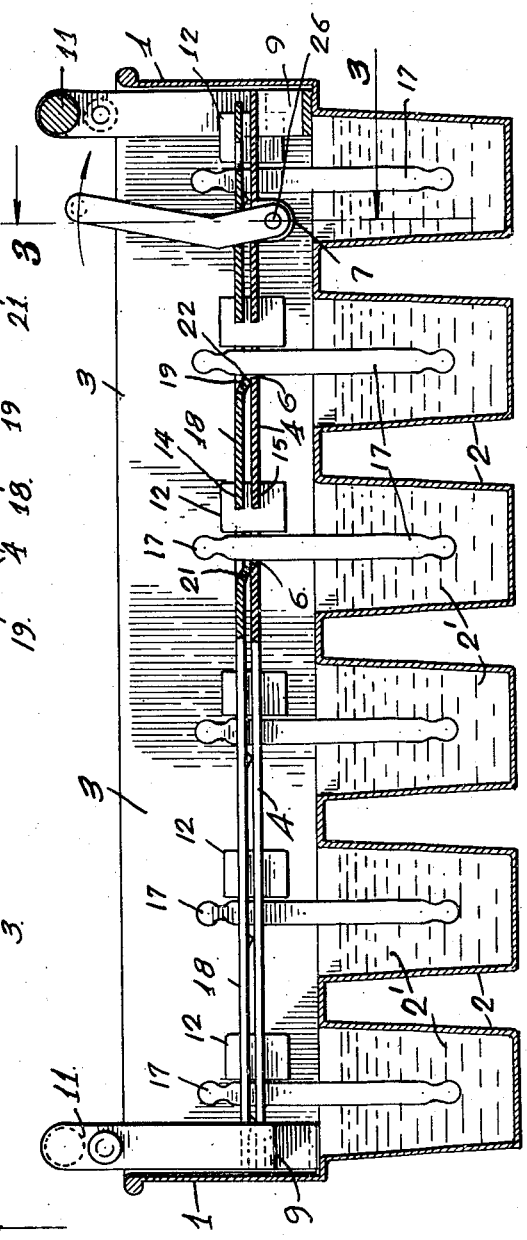
Fig. 2 is a full longitudinal sectional view, with sticks inserted, taken on line 2—2 of Fig. 1 in the direction indicated.

By means of the handles 11, the entire holder with its supply of sticks or handles 17 is lowered into the basin 3 until the lower ends of said sticks extend to the required distance into the liquid or plastic contents of the molds 2, as fully disclosed in Fig. 2 of the drawings.

After the ingredient 2' is firmly congealed on the sticks 17, the pan 1 and molds 2 are defrosted to separate the finished product therefrom. The holder is then lifted by means of its handles 11, at the same time firmly holding the lever 23 in gripping position, and the tightly gripped sticks or handles 17 are lifted from the molds with the frozen confections adhering thereto.

The lever 23 is then moved to releasing position and the sharp edges 22 of the lugs 21 of the grid 18 will be moved to disengage the sticks 17.

In the production of confections it is highly essential that all mechanism used in connection therewith shall be readily accessible for cleaning purposes.

In the present invention, after the finished confection and sticks 17 are removed from the holder, the legs of the operating lever 23 are sprung apart until the pins thereon are released from the apertured lugs 7, as disclosed in dotted lines in Fig. 3 of the drawings, when said lever may be removed from the holder. As the limiting moving means of the grid is now removed, said grid may be moved longitudinally until the ends of the slots 19 thereof are cleared or released from the upper slots 14 of the blocks 12. The grid 18 may be then lifted from said blocks 12 and separated from the plate 4. Both sides of the plate 4 and grid 18 are then fully accessible for cleaning purposes.

A further important advantage of the present invention is that the plate 4 forms a practically closed cover over the molds 2 and ingredients 2' thereof and affords a maximum protection against splashing brine through which the pan 1 is moved during the congealing process.

I am aware that the present state of the art discloses means for gripping and holding in fixed position a plurality of sticks within molds for congealing thereon frozen confections in a certain relative position to said sticks. I therefore do not broadly claim such a device.

Having described my invention I claim:

1. A holder comprising a plate having a plurality of slots; a grid slidably mounted in spaced relation to said plate and having slots substantially registering with the slots of said plate; blocks mounted on said plate and extending through the slots of said grid to hold said slots substantially in registration with the slots in the plate; and means for moving said grid relatively to said plate to grip sticks inserted through said registering slots.

2. A holder comprising a plate having a plurality of slots; a block mounted within one end of each slot and extending laterally from said plate; a grid having slots substantially registering with the slots of said plate and slidably mounted on said blocks to hold said grid in parallel spaced relation to said plate, one end of each slot in said grid having a sharp edge; and means for moving said grid and sharp edges to engage sticks inserted through said registering slots.

3. A holder comprising a plate having a plurality of longitudinally disposed slots; a block rigidly secured within one end of each slot and extending laterally from said plate and provided with a longitudinally disposed slot arranged in parallel spaced relation to said plate; a grid having slots substantially registering with the slots of the plate, one end of each grid slot slidably engaging the slot in the block of a registering slot in the plate, and the opposite end of each grid slot being provided with a sharp edge; and means for moving said grid and sharp edges to engage sticks inserted through said registering slots to hold said sticks against said blocks and laterally to said plate and grid.

4. A holder comprising a plate having a plurality of longitudinally disposed slots; a block rigidly secured within one end of each slot and extending laterally from said plate and provided with a longitudinally disposed slot arranged in parallel spaced relation to said plate; a grid having slots substantially registering with the slots of said plate, one end of each slot slidably engaging the slot in the block of its registering slot, the opposite end of each grid slot being provided with a sharp edge; and a lever detachably and pivotally mounted on said plate and engaging said grid for limited movement thereof relatively to said plate, and for moving said grid and sharp edges thereon to engage and hold sticks inserted through registering slots against said blocks and against longitudinal movement of said sticks.

ARTHUR L. SLEE.